United States Patent [19]
Louder et al.

[11] 3,772,591
[45] Nov. 13, 1973

[54] METHOD AND APPARATUS FOR ANALYZING BLOOD PROPERTIES

[75] Inventors: Nevitt M. Louder, Penn Hills; Ronald Ferrie, Pittsburgh, both of Pa.

[73] Assignee: Fisher Scientific Company, Pittsburgh, Pa.

[22] Filed: Apr. 12, 1972

[21] Appl. No.: 243,182

[52] U.S. Cl. ............... 324/30 R, 23/230 B, 128/2.1
[51] Int. Cl. ........................................... G01n 27/42
[58] Field of Search ................. 324/29, 30 R, 30 B, 324/65, 65 P; 128/2 G, 2.1 E; 23/230 B

[56] References Cited
UNITED STATES PATENTS
3,170,111 2/1965 Case.................................. 324/30 B
3,250,987 5/1966 Okada............................... 324/30 B
3,699,437 10/1972 Ur..................................... 23/230 B Primary Examiner—Michael J. Lynch
Attorney—John M. Webb

[57] ABSTRACT

Method and apparatus for determining the hematocrit and related properties of blood samples by determining the electrical conductance thereof. A sample probe is employed which has two spaced electrodes in the form of capillary tubes on either side of a nonconducting capillary tube. The probe forms an electrical resistivity measuring leg of an A-C bridge circuit and the unbalance of the circuit caused by replacement of a portion of a diluent by the blood sample is measured and transformed into the desired analysis.

2 Claims, 4 Drawing Figures

TIME IN SECONDS

METHOD AND APPARATUS FOR ANALYZING BLOOD PROPERTIES

The invention relates to blood testing and, more particularly, to a method and apparatus for automatically determining the hematocrit and related properties.

There are several existing systems employed to measure the hematocrit of a blood sample, which is the ratio, usually expressed in per cent, of the total volume of red cells to the total volume of the sample.

The conventional but time consuming system consists of centrifuging a blood sample in a test tube having a capillary size opening and after the red cells have collected at the bottom of the tube, measuring the height of the packed cells and comparing that height with the total height of the sample. The chance for human error is high with this arrangement.

Another system measures hematocrit by means of an electrical conductance determination of a fixed volume of whole blood. This system has several drawbacks since the blood electrolytes contained in the plasma alter the conductance value of the whole blood and is, therefore, detrimental to an expression of the hematocrit when the electrolyte level varies as is indicated in pathological specimens. In addition, the null balance operation of the bridge circuit employed does not effectively reflect the portion of the instrumentation involved in the measure of the specimen. Further, due to the viscous and tenacious nature of whole blood, the bore of the specimen electrode requires thorough washout between determinations.

The hematocrit is also measured indirectly by individually counting red cells in a 50,000:1 dilution while simultaneously measuring the corpuscular volume. The hematocrit is then computed as the product of the total cell count and the mean cell volume. The actual measurement is also an electrical conductance method in which the current densities have been judged as producing red cell volume distortions. This system is subject to error in counting and in the dilution of the sample. Further, the isotonicity of the diluent and its distortion of the cell shape present further drawbacks.

Our invention substantially reduces the time to obtain a hematocrit measurement as compared with the conventional centrifuging method. Our invention also provides accurate hematocrit measurements over all ranges of hematocrits. Further, our invention provides a minimum of diluent and a built-in means for sample probe washout between determinations. And still further, our invention permits pertinent null circuit obtention and simplifies the determinations to eliminate chance for error.

Our invention is a method and apparatus for hematocrit and related property determination. The apparatus includes a capillary glass tube having spaced electrode end pieces, one of which is the end probe, and which form an electrical resistivity measuring leg of a bridge circuit. The probe initially contains all diluent and then a predetermined amount of blood sample is drawn therein and the electrical unbalance of the bridge circuit caused thereby is measured. The level of unbalance in the form of an A-C signal is amplified, filtered, rectified and amplified and then digitalized, counted, stored, etc. for demand print-out when a hematocrit or related calculable measurement such as mean corpuscular volume is desired.

In the accompanying drawings, we have shown one preferred embodiment of our invention in which.

From the outset, it should be recognized that it is known in the art that the electrical conductance of whole blood is an accurate index of the blood's hematocrit and that our invention provides an improved method and apparatus for making that determination. Therefore, other measurements relating to the hematocrit are also determinable from the electrical conductance and are readily calculable therefrom.

Figures 1, 2, 4:
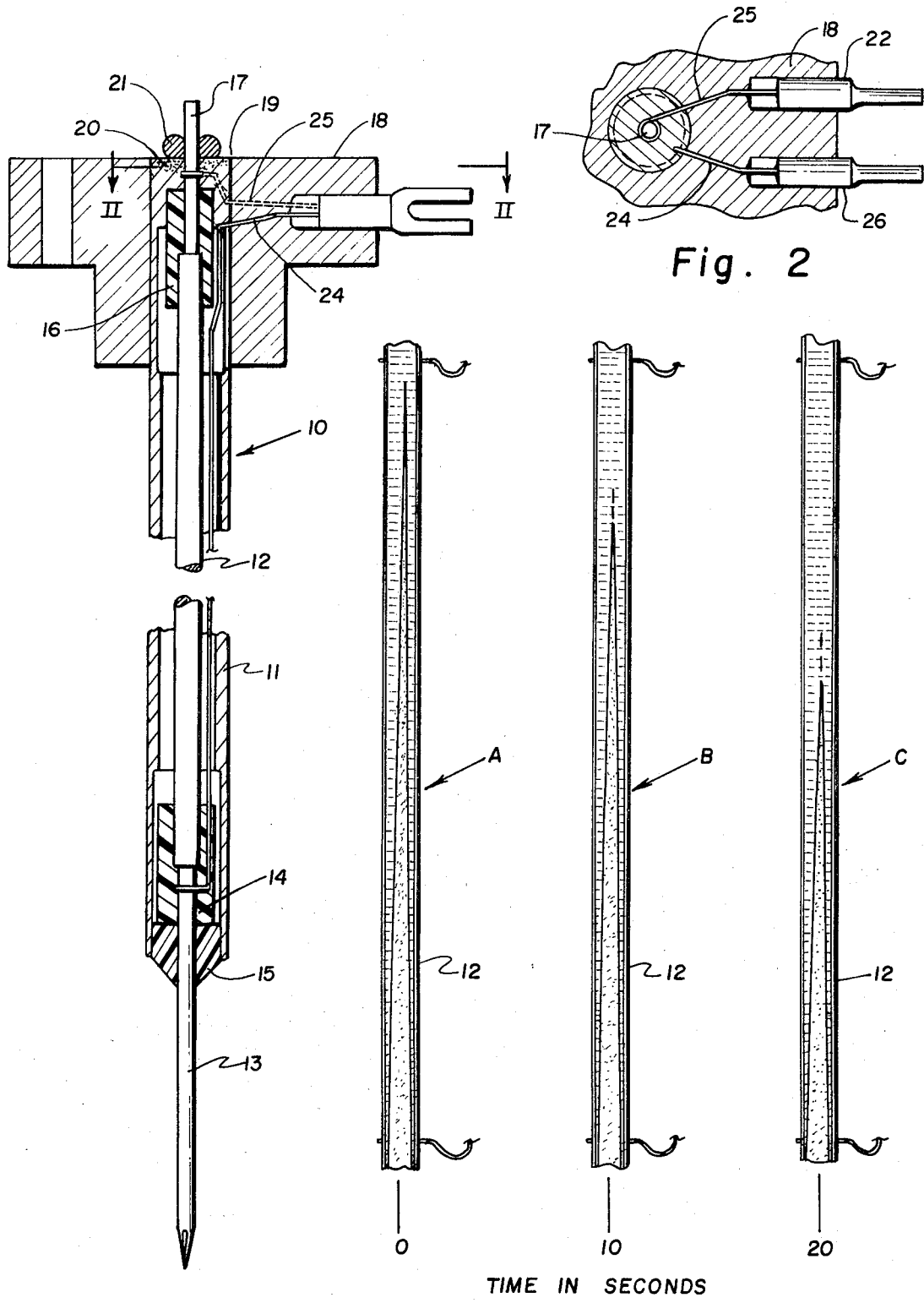
FIG. 1 is a schematic partly in section of the hematocrit probe.
FIG. 2 is a section taken along section lines II—II of FIG. 1.
FIG. 4 is a three stage, sequential representation of the settling of the blood sample in the diluent.

The basic structure of our invention is the sample probe itself, generally designated 10, FIG. 1. The probe includes an outer protective stainless steel jacket 11 and an inner concentric glass capillary tube 12. Glass capillary tube 12 connects at one end to stainless steel capillary end probe 13 through a section of Tygon tubing 14. End probe 13, which acts as an electrode, is further held in place by nose piece 15 which is ajdacent tubing 14. Nose piece 15 is press fit into the end of jacket 11 and end probe 13 projects therethrough.

The upper end of capillary tube 12 is also connected by means of Tygon tubing 16 to a stainless steel capillary tube 17 which forms the other electrode. The various tubes and tubing are supported by housing 18 which has a cylindrical passage 19 through which protective jacket 11 is secured and stainless steel capillary tube 17 projects. An epoxy adhesive 20 placed in the open end of housing 18 further secures Tygon tubing 16 and capillary tube 17 in place. Tube 17 extends through epoxy adhesive 20, is further secured by a quad ring 21 positioned atop adhesive 20 and connects to a pump system (not shown) for drawing samples.

Terminals 22 and 26 are securably positioned through housing 18, FIG. 2. A thin electrode wire 25 extends from terminal 22 and connects as the ground wire to stainless steel tube 17 and a thin electrode wire 24 extends from terminal 26 and connects as the hot wire to stainless steel end probe 13. The hot wire 24 extends within protective steel jacket 11 and along the glass tube 12.

The probe 10 can be employed with a number of existing sampling apparatus such as the Fisher Diluter Model 240 or the Fisher Hemalyzer, U.S. Pat. No. 3,537,794.

Figure 3:
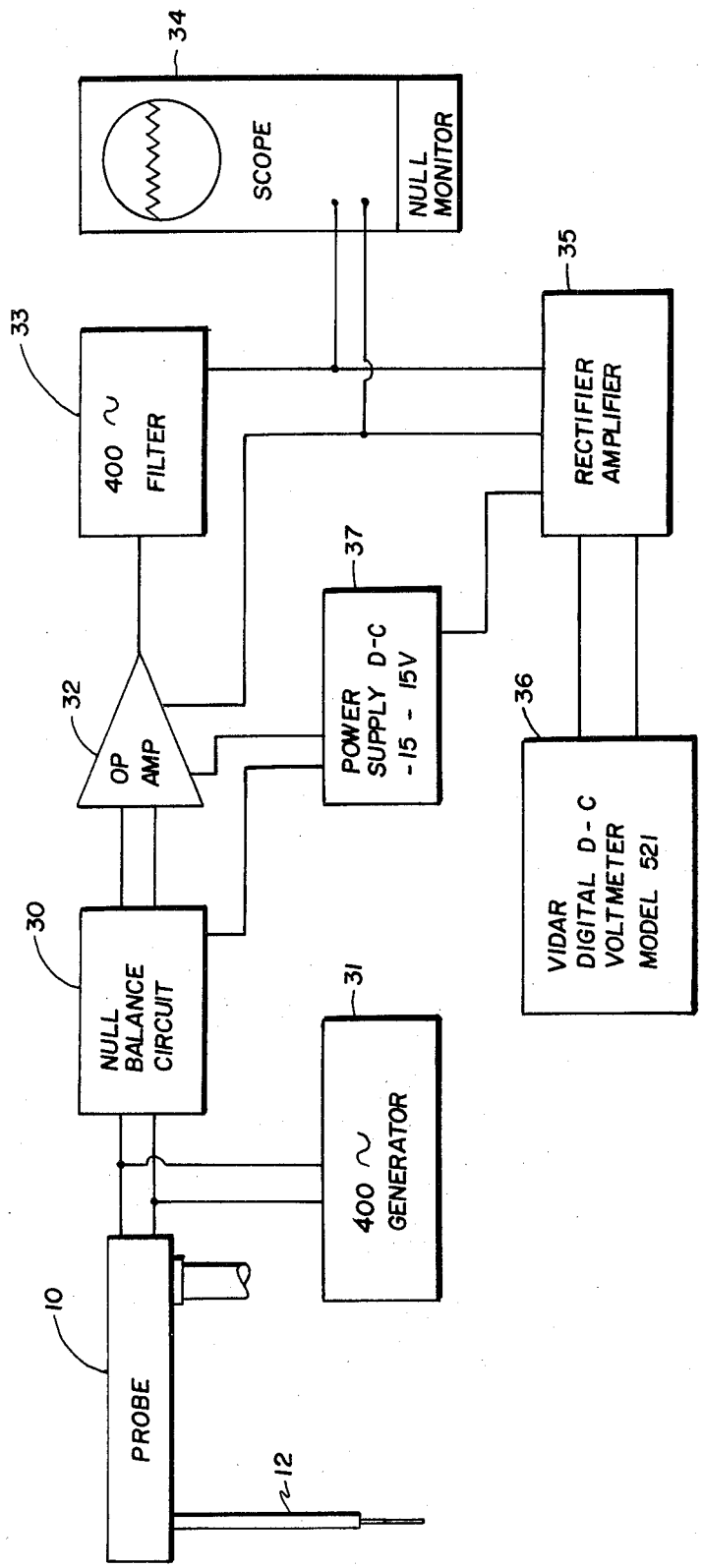
FIG. 3 is a block diagram of the hematocrit measurement system.

The circuitry which connects to the electrodes on the probe 10 is depicted in block form in FIG. 3. The capillary glass tube 12 having the stainless steel end pieces 13 and 17 forms one resistive leg of an A-C bridge circuit 30, termed "Null Balance" in FIG. 3. Bridge circuit 30 is powered by a 400 cycle, 0–2 volt generator 31. The A-C signal caused by the unbalance of bridge circuit 30 passes through operational amplifier 32, is filtered by a 400 cycle filter 33 and rectified and amplified by a simple combination rectifier-amplifier 35. The measure of rectification is read out on a Digital D-C voltmeter 36. Scope 34 displays the A-C signal and serves as the manual adjustment of the bridge null conditions. The rectifier-amplifier 35 plus the bridge source requires a +15 VDC, whereas the operational amplifier 32 requires a −15 VDC, both of which are supplied by power source 37.

The operation of our invention is described hereinafter with respect to a specific trial run conducted. The probe 10 is positioned with respect to a sample cup (not shown). Probe 10, between the electrodes, contains a liquid volume of 23.73 mm$^3$ of a saline solution diluent received, for example, from a diluter module. During positioning, the bridge null is electronically established. The probe 10 descends into the sample and the diluter module connected thereto pulls a 20 u-liter sample into the probe. This 20 u-liter blood sample includes a volume of 11.26 mm$^3$ up to the first electrode and a volume of 8.74 mm$^3$ between electrodes and, therefore, a resultant saline solution of 14.99 mm$^3$. As the sample is being drawn, the A-C bridge is immediately unbalanced. At the instant, the total whole blood sample is drawn or, when a signal is received for the probe to ascend from the sample cup, the bridge unbalance signal is operationally amplified, filtered, rectified and amplified and then stored for print-out in the form of a hematocrit reading or a mean corpuscular volume reading or any other related reading which is obtainable by means already known in the art. The probe is then flushed, the bridge null again electronically established and the next determination is ready to begin.

The blood column within the capillary tube changes in the course of time, thereby making the point in time when the bridge unbalance is measured a critical factor. This change of the blood column is depicted in FIG. 4 wherein column B represents a 10 sec. interval from column A and column C represents a 10 sec. interval from column B.

Column A represents the initial draw of blood into the diluent. The column of blood feathers to a filament within the envelope of diluent. The walls of the capillary tube 12 remain wetted by the diluent, thereby eliminating any deleterious effects caused by the blood sample adhering to the capillary tube wall. This further simplifies the flushing operation which removes the blood sample and places a new charge of diluent in place. The column B of whole blood immediately begins to settle and to a slight extend, the filament of whole blood segments. This blood settling continues as shown in column C with the passage of additional time. We have found that each 10 sec. interval changes the hematocrit measurement by increasing it by an amount of about 5 percent. Therefore, even though the amount of blood and diluent between the electrodes is fixed, it is necessary to immediately measure the bridge unbalance upon drawing the sample. In addition to the physical decomposition of the blood between the electrodes with respect to the diluent, temperature is critical and delaying the measurement may also be self-defeating due to the superimposed temperature drift. Therefore, it can be seen that an immediate measurement upon drawing a sample is essential.

We claim:

1. A method of analyzing properties of blood determinable from the electrical conductance thereof comprising drawing a given amount of diluent into a sample probe, the sample probe including two spaced electrodes in the form of capillary tubes positioned at opposing ends of a nonconducting capillary tube and forming one electrical resistivity measuring leg of a balanced bridge circuit, replacing a portion of the diluent between the electrodes with a known amount of blood sample, measuring the unbalance of bridge caused by the replacement of the diluent with the blood, transforming the unbalance in the form of an electrical signal into the desired blood analysis.

2. The method of claim 1 including measuring the unbalance of the bridge immediately upon replacing a portion of the diluent with the given amount of blood sample.

* * * * *